US012779791B2

(12) United States Patent
Van Beek

(10) Patent No.: US 12,779,791 B2
(45) Date of Patent: Nov. 3, 2026

(54) METHOD AND SPLICER FOR SPLICING A LEADING END AND A TRAILING END OF A TIRE COMPONENT

(71) Applicant: VMI Holland B.V., Epe (NL)

(72) Inventor: Willem Marinus Van Beek, Epe (NL)

(73) Assignee: VMI HOLLAND B.V. (NL)

( * ) Notice: Subject to any disclaimer, the term of this patent is extended or adjusted under 35 U.S.C. 154(b) by 292 days.

(21) Appl. No.: 18/278,612

(22) PCT Filed: Feb. 16, 2022

(86) PCT No.: PCT/NL2022/050079
§ 371 (c)(1),
(2) Date: Aug. 23, 2023

(87) PCT Pub. No.: WO2022/186688
PCT Pub. Date: Sep. 9, 2022

(65) Prior Publication Data

US 2024/0140046 A1 May 2, 2024

(30) Foreign Application Priority Data

Mar. 1, 2021 (NL) ...................................... 2027675

(51) Int. Cl.
*B29C 65/00* (2006.01)
*B29D 30/48* (2006.01)

(52) U.S. Cl.
CPC ........ *B29C 66/022* (2013.01); *B29C 66/1142* (2013.01); *B29C 66/24241* (2013.01);
(Continued)

(58) Field of Classification Search
CPC ................ B29C 66/022; B29C 66/836; B29C 66/24241; B29D 2030/481;
(Continued)

(56) References Cited

U.S. PATENT DOCUMENTS 4,892,608 A * 1/1990 Lippa ...................... B29C 66/43 156/581
2008/0017297 A1 1/2008 Tanaka et al. ............ 156/110.1
2014/0318681 A1* 10/2014 Yamamoto ........ B29C 66/81423 156/60

FOREIGN PATENT DOCUMENTS

DE 102004024715 12/2005 ............ B29D 30/42
EP 2455216 5/2012 ............ B29D 30/38
(Continued)

OTHER PUBLICATIONS

Tsuge. WO2018016182. 2018. Machine Translation via ESpaceNet. (Year: 2025).*

(Continued)

*Primary Examiner* — Sedef E Paquette
*Assistant Examiner* — Alexander D Booth
(74) *Attorney, Agent, or Firm* — HAYES SOLOWAY P.C.

(57) ABSTRACT

A method and a splicer for splicing a leading end and a trailing end of a tire component together. The method includes the steps of:

a) splicing the leading end and the trailing end together along a splice path extending across the tire component, in a splice direction from a first side of the tire component towards a second side of the tire component opposite to the first side; and
b) prior to the splicing, forming a preliminary joint between the leading end and the trailing end at a preparatory splice position along the splice path that is closer to the second side than the first side.

20 Claims, 14 Drawing Sheets

(52) U.S. Cl.
CPC ........ *B29C 66/814* (2013.01); *B29C 66/8242* (2013.01); *B29C 66/828* (2013.01); *B29C 66/83* (2013.01); *B29C 66/92445* (2013.01); *B29D 30/48* (2013.01); *B29C 2791/001* (2013.01); *B29D 2030/481* (2013.01)

(58) Field of Classification Search
CPC ........ B29D 2030/423; B29D 2030/422; B29D 2030/3257; B29D 2030/482
See application file for complete search history.

(56) References Cited

FOREIGN PATENT DOCUMENTS

| | | | | |
|---|---|---|---|---|
| JP | 2007320196 | | 12/2007 | B29D 30/30 |
| JP | 2011218739 | | 11/2011 | B29D 30/30 |
| JP | 2011218739 A | * | 11/2011 | B29C 66/8242 |
| JP | 201371304 | | 4/2013 | B29D 30/38 |
| JP | 2015202648 | | 11/2015 | B29D 30/48 |
| JP | 201943064 | | 3/2019 | B29D 30/06 |
| JP | 2020110936 | | 7/2020 | B29D 30/28 |
| WO | 2011125405 | | 10/2011 | B29D 30/30 |
| WO | 2012099458 | | 7/2012 | B29D 30/42 |
| WO | WO-2018016182 A1 | * | 1/2018 | B60C 15/04 |
| WO | 2019083355 | | 5/2019 | B26D 1/00 |
| WO | 2021034437 | | 2/2021 | B29D 30/30 |

OTHER PUBLICATIONS

Katagiri et al. JP2011218739A. 2011. Machine translation via ESpaceNet. (Year: 2026).*
International Search Report and Written Opinion issued in PCT/NL2022/050079, dated May 16, 2022, 9 pages.
International Preliminary Report on Patentability issued in PCT/NL2022/050079, dated Aug. 29, 2023, 6 pages.
Office Action issued in Japanese Patent Appln. Serial No. 2022-535574, dated Nov. 7, 2023, with machine translation, 8 pages.

* cited by examiner

METHOD AND SPLICER FOR SPLICING A LEADING END AND A TRAILING END OF A TIRE COMPONENT

CROSS REFERENCE TO RELATED APPLICATIONS

This application is a US National Phase of PCT International Patent Application Serial No. PCT/NL2022/050079, filed Feb. 16, 2022, which claims priority to Netherlands Patent Application Serial No. 2027675, filed Mar. 1, 2021, the contents of which are incorporated herein by reference.

BACKGROUND

The invention relates to a method and a splicer for splicing a leading end and a trailing end of a tire component, in particular an apex or filler strip, together.

Conventionally, the leading end and the trailing end of an apex are spliced in an overlapping configuration using a splicer having a relatively large splice roller, i.e. a roller with a radius larger than the width of the apex. However, the relatively large splice roller is unable to reliably splice the apex, in particular in the thin top portion thereof.

To solve the aforementioned problem, it is known to alternatively provide the splicer with a relatively small splice roller that can closely follow the contour of the apex during the splicing. The relatively small splice roller has the additional advantage that it can exert a relatively high pressure force onto the surface of the apex.

SUMMARY OF THE INVENTION

A disadvantage of the known small splice roller compared to the relatively large splice roller is that the rubber material of the apex tends to bulge or wave ahead of the small splice roller, which may adversely affect the consistency of the splicing. In particular, the leading end and the trailing end may shift slightly with respect to each other and/or the splice may not be closed entirely as a result of the bulging or waving. The leading end and the trailing end may thus remain split or may be forced away from each other even further as the small splice roller passes by.

It is an object of the present invention to provide a method and a splicer for splicing a leading end and a trailing end of a tire component, in particular an apex or filler strip, together, wherein the quality and/or consistency of the splice can be improved.

According to a first aspect, the invention provides a method for splicing a leading end and a trailing end of a tire component together, wherein the method comprises the steps of:

a) splicing the leading end and the trailing end together along a splice path extending across the tire component, in a splice direction from a first side of the tire component towards a second side of the tire component opposite to the first side; and b) prior to the splicing, forming a preliminary joint between the leading end and the trailing end at a preparatory splice position along the splice path;

wherein the preparatory splice position is spaced apart from the first side.

The preliminary joint between the leading end and the trailing end at the preparatory splice position can prevent that the leading end and the trailing end split towards the second side of the tire component as a result of any waving or bulging during the subsequent splicing in step a). Hence, a closed splice can be obtained, even when exerting a relatively high pressure force onto the tire component during step a) with a relatively small first splice member. A higher pressure force can result in a more consistent, more reliable and/or higher quality splice. Moreover, a relatively small first splice member can follow the contour of the tire component more accurately.

In a preferred embodiment, the preparatory splice position is closer to the second side than the first side. The preparatory splice position is preferably located as close as possible to or at the second side to prevent further splitting of the leading end and the trailing end downstream of said preparatory splice position in the splice direction.

Preferably, the leading end and the trailing end are spliced between the first side and the preparatory splice position by the splicing of step a) only. Hence, there is no splicing in the area between the first side and the preparatory splice position other than the splicing of step a) in the splice direction. The leading end and the trailing end have not yet been exposed to the waving or bulging that occurs during step a). The preliminary joint can thus still be formed reliably and/or without losing dimensional accuracy prior to the splicing in step a).

In a further embodiment the splicing of step a) is performed continuously from the first side up to the second side. Hence, the splice can be as consistent as possible.

In another embodiment the leading end and the trailing end are pressed in step b) in a pressing direction transverse or perpendicular to the splice direction and/or normal to a surface of the tire component that is being pressed. The pressing causes the material of the tire component at the leading end and the trailing end to adhere and form the preliminary joint. The pressing of step b) occurs in a direction different from the splice direction, to allow for a local pressing of the leading end and the trailing end at the preparatory splice position only, without interfering with the area of the tire component between the first side and the preparatory splice position.

In one particular embodiment the tire component is an apex. An apex is spliced into an annular shape when combining the apex with a bead, i.e. on a bead-apex drum.

In particular, the apex has a triangular cross section with a base and a tip, wherein the first side is the tip and the second side is the base. The apex has a considerably larger volume or mass at the base, which is therefore most likely to split during splicing with a relatively high pressure force. Hence, by pressing the leading end and the trailing end in step b) at or near the base, splitting of said leading end and said trailing end during the subsequent splicing from the tip towards the base in step a) can be effectively prevented.

Alternatively, the first side is the base and the second side is the tip. In that case, the tip can be prepared in step b) for the relatively high pressure force exerted onto the apex during the splicing of step a) from the base towards the tip.

In another embodiment a first splice member is used for the splicing in step a) and a second splice member is used for the forming of the preliminary joint in step b). By having two splice members instead of a single splice member, step a) can be performed shortly or directly after step b). Moreover, each splice member can be optimized for its particular function. For example, the type, shape or dimensions of the splice members may be different.

In a preferred embodiment thereof the first splice member trails the second splice member in the splice direction. Hence, the first splice member can already be in position behind the second splice member to perform the splicing of step a) when the forming of the preliminary joint of step b) has been completed.

In a further embodiment the first splice member is a first splice roller that is rotatable about a first roller axis, wherein the splicing in step a) is achieved by rolling the first splice roller along the splice path in the splice direction. The first splice roller can uniformly splice the leading end and the trailing end together by rolling along the splice path while exerting a pressure force onto the tire component.

Preferably, the first splice member is moved along the splice path as part of a rocking motion about a rocking axis. The rocking motion is a relatively simple and easily controllable motion. It does not require complex multi-axis manipulator or an XY-drive system. Moreover, when the radius of the rocking motion is large enough, it can approximate a linear movement.

More preferably, the first splice member and the second splice member are moved together in the rocking motion about the rocking axis. Consequently, there is no need for individual holders or drives. Instead, the first splice member and the second splice member can be mounted on a common holder moving together or in unison. The first splice member may conveniently trail the second splice member in the splice direction to perform the splicing in step b) shortly or directly after the forming of the preliminary joint in step b) has been completed. Step b) can be followed by step a) in a single movement.

In a further embodiment the second splice member comprises at least one second splice roller, wherein the method further comprises the step of rolling the at least one second splice roller along the splice path in the splice direction away from the preparatory splice position after the forming of the preliminary joint in step b). In this manner, the second splice roller can prepare the leading end and the trailing end for the splicing in step a) not only in the preparatory splice position, but also in the area of the tire component between the preparatory splice position and the second side. Hence, it can be prevented that, when the preparatory splice position is spaced apart from the second side, the leading end and the trailing end are split downstream of the preparatory splice position in the splice direction. Moreover, the second splice roller can roll away from the preparatory splice position in the same way as and/or in single movement with the first splice roller approaching the preparatory splice position.

In an alternative embodiment the second splice member comprises a non-circular pressing member, wherein the pressing in step b) is achieved by pressing the non-circular pressing member onto the leading end and the trailing end at the preparatory splice position. The non-circular pressing member is not configured to roll over the tire component in the splice direction. Instead, it can be moved towards and away from the tire component to complete the pressing in step b).

In a further alternative embodiment the first splice member and the second splice member are independently movable relative to each other. Hence, the individual movements can be optimized for the respective steps to be performed by said splice members in terms of timing, speed, forces and/or interference between the steps.

In another embodiment the leading end and the trailing end are supported on a splice support extending at a support height, wherein the second splice member is movable in a pressing direction transverse or perpendicular to the splice direction towards said splice support up to a floating height short of said support height. In this way, it can be prevented that the second splice member excessively deforms the tire component, for example when the tire component is an apex and the second splice members rolls of the base at the second side of the apex. In other words, by limiting the movement or the stroke of the second splice member at the floating height, the second splice member remains floating above the splice support without excessively compressing or deflecting the material of the tire component.

Preferably, the floating height is adjustable, wherein the floating height is set prior to the forming of the preliminary joint of step b). The floating height can thus be set depending on the characteristics, i.e. the shape and/or dimensions, of the tire component to be pressed.

In another embodiment the leading end and the trailing end are pressed in step b) with a pressing force that is variable, wherein the pressing force is varied during or set prior to the pressing of step b). The pressure force can thus be set depending on the characteristics, i.e. the compound or the recipe, of the tire component to be pressed.

In another embodiment the leading end and the trailing end are spliced in step a) with a splice force that is variable, wherein the splice force is varied during or set prior to the splicing of step a). The splice force can for example be varied depending on the shape and/or characteristics of the tire component, to obtain a uniform and/or reliable splice.

According to a second aspect, the invention provides a splicer for splicing a leading end and a trailing end of a tire component together, in particular an apex, wherein the splicer comprises a first splice member for splicing the leading end and the trailing end together along a splice path extending across the tire component, in a splice direction from a first side of the tire component towards a second side of the tire component opposite to the first side, wherein the splicer further comprises a second splice member for forming a preliminary joint between the leading end and the trailing end at a preparatory splice position along the splice path, wherein the preparatory splice position is spaced apart from the first side.

The splicer can be used to perform step b) and step a) of the aforementioned method, and consequently has the same technical advantages, which will not be repeated hereafter.

In one embodiment of the splicer the first splice member trails the second splice member in the splice direction.

In a further embodiment of the splicer the first splice member is a first splice roller that is rotatable about a first roller axis.

Alternatively, the first splice member comprises a circular segment that is rotatable about a swivel axis. The circular segment can be rocked back-and-forth along the splice path along at least a part of its circumference.

In a further embodiment the splicer comprises a base and a holder that is rotatable relative to said base in a rocking motion about a rocking axis, wherein the first splice member is mounted to said holder and movable together with said holder in the rocking motion about the rocking axis.

Preferably, the second splice member is mounted to the holder and movable together with the first splice member in the rocking motion about the rocking axis.

Additionally or alternatively, the splicer comprises a rocking drive for driving the rotation of the holder about the rocking axis.

In another embodiment the splicer comprises a pressing drive for biasing the first splice member and/or the second splice member in a pressing direction transverse or perpendicular to the splice direction and/or normal to a surface of the tire component that is being pressed, towards the tire component. As a result of the biasing, the first splice member and/or the second splice member can exert a consistent and/or uniform pressing force onto the tire component during the splicing and/or the pressing. Furthermore, the biasing can improve the ability of the first splice member and/or the second splice member to follow a substantially linear path, i.e. parallel to the splice direction, while the aforementioned holder is being rotated about the rocking axis. In particular, the biasing can introduce a radial component to the otherwise rotary movement.

Preferably, the pressing drive is a pneumatic cylinder. The pneumatic cylinder can be pressurized to adaptively bias the first splice member and/or the second splice member in response to the shape and/or dimensions of the tire component.

In another embodiment of the splicer the second splice member comprises a second splice roller that is rotatable about a second roller axis.

Alternatively, the second splice member comprises two or more second splice rollers that are rotatable about mutually parallel and spaced apart second roller axes. The two or more second splice rollers can be even smaller than the aforementioned (single) second splice roller to exert an even higher local pressing force onto the tire component. Moreover, pressing the tire component in two spaced apart positions, the most upstream position being the preparatory splice position, can improve the reliability of the preliminary joint(s) formed by said two or more second splice rollers.

Additionally or alternatively, the first splice member comprises two or more first splice rollers that are rotatable about mutually parallel and spaced apart first roller axes. The two or more first splice rollers can be even smaller than the aforementioned single second splice roller, or have the same size as the aforementioned set of two second splice rollers, to exert a relatively high local splicing force onto the tire component along the splice path. Because of the preliminary joint, splitting of the leading end and the trailing end ahead of the two or more first splice rollers can be prevented.

In a further alternative embodiment the second splice member comprises a non-circular pressing member.

In another embodiment of the splicer the first splice member and the second splice member are independently movable relative to each other.

Preferably, the splicer comprises a first drive for moving the first splice member and a second drive for moving the second splice member. The first drive and the second drive can be controlled independently.

In a further embodiment the splicer comprises one or more drives for driving the first splice member and the second splice member and a control unit that is operationally connected to the one or more drives, wherein the control unit is configured for controlling the one or more drives to perform the following steps:

a) moving the first splice member along the splice path in the splice direction for splicing the leading end and the trailing end together along said splice path; and
b) prior to the movement in step a), moving the second splice member to the preparatory splice position for forming a preliminary joint between the leading end and the trailing end at said preparatory splice position.

Hence, in addition to the aforementioned splicer being suitable for performing the steps of the aforementioned method, in this embodiment it is actually configured, i.e. specifically adapted or programmed, to perform the steps.

It will be appreciated by one skilled in the art that the two steps of the method can also be performed with a single splice member moving first into the preparatory splice position and subsequently moving in the splice direction along the splice path. Although this may cause a slight delay in between the steps, such a variation is also considered within the scope of the present invention. Such an alternative splicer is not characterized by having two splicer members. Instead, it is being characterized by having a control unit programmed to control a single splice member in a particular manner.

In particular, the invention provides, according to a third aspect, a splicer for splicing a leading end and a trailing end of a tire component, in particular an apex, together, wherein the splicer comprises a splice member, a drive for moving the splice member and a control unit that is operationally connected to the drive, wherein the control unit is configured for controlling the drive to perform the following steps:

a) moving the splice member along a splice path extending across the tire component, in a splice direction from a first side of the tire component towards a second side of the tire component opposite to the first side for splicing the leading end and the trailing end together along said splice path; and
b) prior to the movement in step a), moving the splice member to a preparatory splice position along the splice path for forming a preliminary joint between the leading end and the trailing end at said preparatory splice position;

wherein the preparatory splice position is spaced apart from the first side.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-6 show a splicer 1 according to a first exemplary embodiment of the invention. The splicer 1 is used for joining, stitching or splicing a leading end LE and a trailing end TE of a tire component 9.

Figure 1:
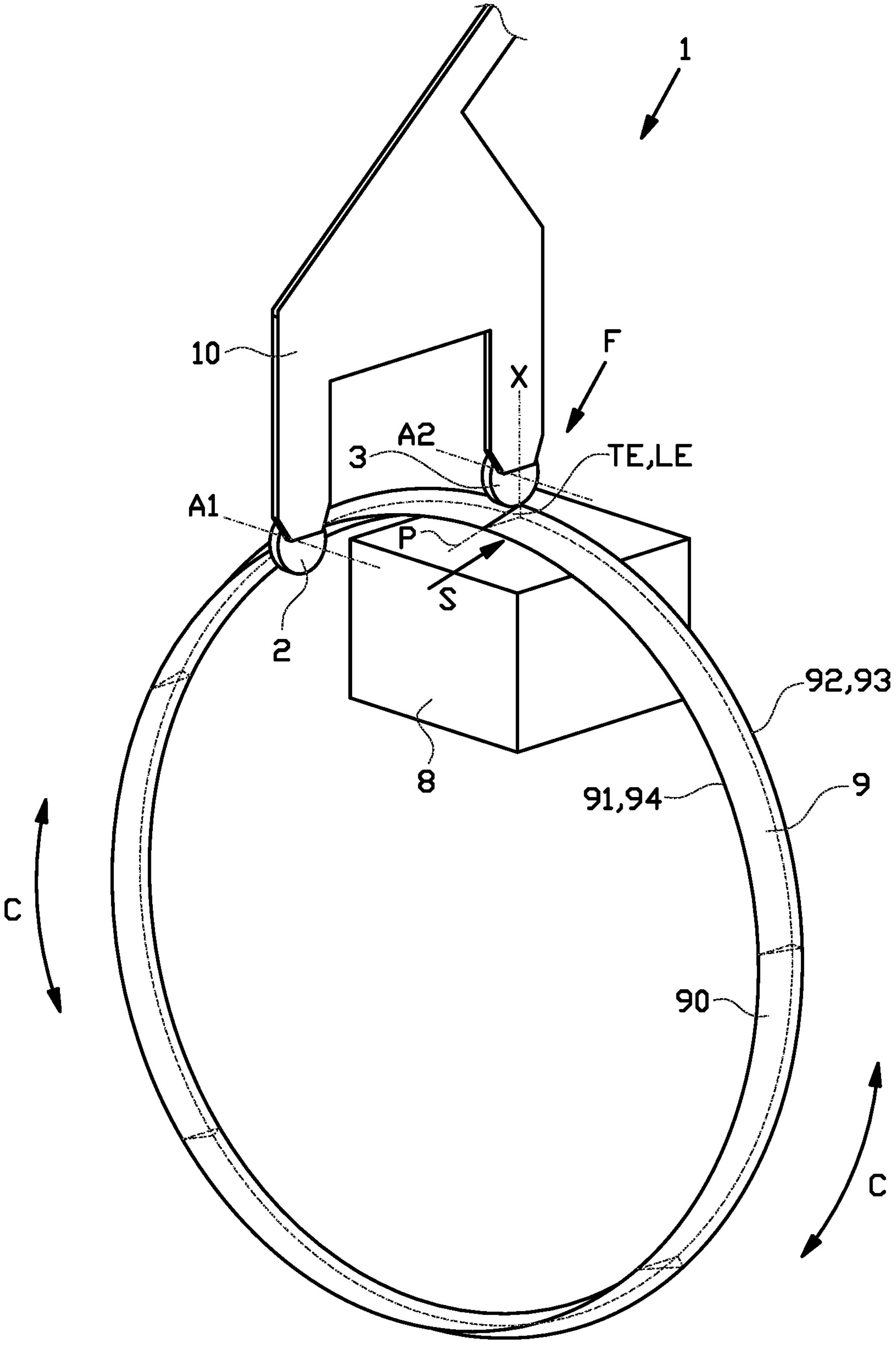
FIG. 1 shows an isometric view of a tire component with a leading end and a trailing end, a splice support and a splicer for splicing the leading end and the trailing end together at the splice support, according to a first exemplary embodiment of the invention.

In this example, the tire component 9 is an apex 9. As shown in FIG. 1, the apex 9 is spliced at the leading end LE and the trailing end TE into an annular or ring shape. In the spliced condition, the apex 9 extends in a circumferential direction C. The apex 9 is typically splice on a bead-apex drum. In FIG. 1-6, the part of the bead-apex drum is schematically represented by a splice support 8. The splice support 8 may be formed by a segment of the aforementioned bead-apex drum, or it may be a dedicated splice table. The apex 9 may be spliced in an orientation in which the apex 9 is laying on the bead-apex drum. The apex 9 is subsequently be turned-up in a manner known per se.

The apex 9 has a strip body 90 that is triangular or substantially triangular in cross section. In particular, the apex 9 has a first side 91 that forms a tip 94 of the triangular cross section and a second side 92, opposite to the first side 91, that forms a base 93 of the triangular cross section. The first side 91 and the second side 92 are the longitudinal sides of the strip body 90 which extend in the circumferential direction C when the apex 9 is spliced.

As shown in FIG. 1, the splicer 1 comprises a first splice member 2, a second splice member 3 and a holder 10 for holding the first splice member 2 and the second splice member 3 relative to the splice support 8.

The first splice member 2 is arranged for splicing the leading end LE and the trailing end TE together along a splice path P extending across the tire component 9 from the first side 91 towards the second side 92, i.e. from the tip 94 towards the base 93. The splice path P extends transverse or perpendicular to the circumferential direction C. The first splice member 2 is moved or driven in a splice direction S in a splice plane Z, parallel to the splice path P, from the first side 91 towards the second side 92, i.e. from the tip 94 towards the base 93, during the splicing of the leading end LE and the trailing end TE together along the splice path P.

In this exemplary embodiment, the first splice member 2 is or comprises a first splice roller 20, i.e. having a circular body, that is rotatable about a first roller axis A1. The first splice roller 20 may have a slightly crowned surface (not shown) to reduce or prevent imprints on the tire component 9. Additionally or alternatively, the first splice roller 20 may have teeth, grooves, serrations or another suitable surface texture (not shown) to improve the joining of the leading end LE and the trailing end TE. The teeth, grooves or serrations may be placed at an oblique angle to the first roller axis A1 to prevent or reduce air pockets between the leading end LE and the trailing end TE during the splicing.

Figure 2:
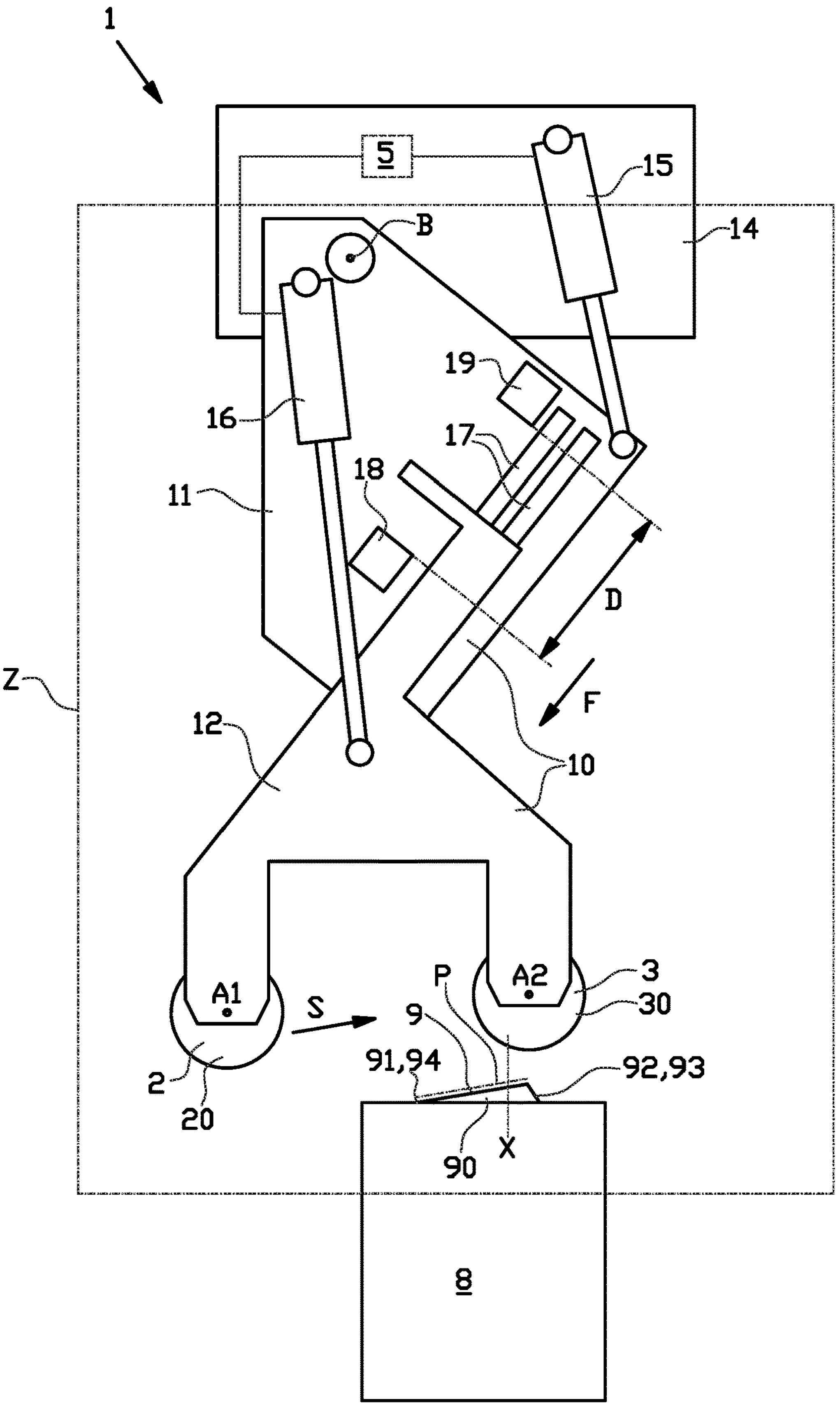
FIGS. 2-5 show side views of the tire component, the splice support and the splicer according to FIG. 1 during the steps of a method for splicing the leading end and the trailing end together.

The second splice member 3 is arranged for pressing onto the leading end LE and the trailing end TE at a preparatory splice position X along the splice path P. As best seen in FIG. 2, the preparatory splice position X is closer to the second side 92, i.e. the base 93, than the first side 91, i.e. the tip 94. In other words, the preparatory splice position X is located in a second half of the splice path P considered in the splice direction S, and/or in the second half of the width of the tire component 9 considered in the splice direction S. The preparatory splice position X may also be located at or very near to the second side 92, for example at a highest point 95 of the base 93.

In this exemplary embodiment, the second splice member 3 is or comprises a second splice roller 30, i.e. having a circular body, that is rotatable about a second roller axis A2. The second roller axis A2 is parallel or substantially parallel to the first roller axis A1. The second splice roller 30, like the first splice roller 20, may have a slightly crowned surface (not shown) to reduce or prevent imprints on the tire component 9. The second splice roller 30 is shown having the same or substantially the same diameter as the first splice roller 20. The diameters of the splice rollers 20, 30 may however be different. The first splice roller 20 may for example have a smaller diameter than the second splice roller 30 to locally increase the pressing force and/or splicing force at the respective splice roller 20, 30 and/or to enable a more accurate following of the contour of the tire component 9.

The holder 10 is arranged for holding both the first splice member 2 and the second splice member 3. In other words, the first splice member 2 and the second splice member 3 are both mounted to the holder 10. The first splice member 2 and the second splice member 3 move together with the holder 10 and remain in the same relative position with respect to each other. In particular, the first splice member 2 is trailing the second splice member 3 in the splice direction S.

The splicer 1 further comprises a frame or a base 14 that is part of the 'fixed world'. The base or frame may be placed directly or indirectly on the factory floor. The holder 10 is mounted to and rotatable relative to said base 14 in a swivel motion or a rocking motion M about a swivel axis or a rocking axis B. The rocking axis B extends perpendicular to the splice plane Z. Preferably, the rocking axis B is parallel or substantially parallel to the first roller axis A1. Alternatively, the first roller axis A1 may be slightly offset with respect to the rocking axis B. As a result, the first splice roller 20 may be at a slightly different toe with respect to the splice path P and/or the splice direction S, to further promote the closing of the splice between the leading end and the trailing end during the splicing. The splicer 1 comprises a rocking drive 15 for driving the rotation of the holder 10 about the rocking axis B. In this example, the rocking drive 15 is a linear drive, such as a pneumatic cylinder, that is arranged between the holder 10 and the base 14 at a position spaced apart from the rocking axis B. Alternatively, the rocking drive 15 may be a suitable rotation drive engaging onto the holder 10 directly at or concentrically to the rocking axis B.

The rocking drive 15 may be provide with a regulator (not shown), for example a throttle valve, in particular an adjustable throttle valve, for controlling the speed of the rotation about the rocking axis B.

The first splice member 2 and the second splice member 3 are located at a radius from the rocking axis B that is sufficiently large so that the circular trajectory followed by said first splice member 2 and the second splice member 3, together with the holder 10, about the rocking axis B, within the range of the splice path P, extends over only a few degrees about said rocking axis B. Hence, the circular trajectory can approximate a linear trajectory.

The splicer 1 further comprises a pressing drive 16 for biasing the first splice member 2 and the second splice member 3 in a pressing direction F transverse or perpendicular to the splice direction S towards the tire component 9. The pressing direction F extends in a plane radial to the rocking axis B and/or the splice roller axes A1, A2, i.e. the plane of the drawing in FIG. 2. The pressing drive 16 can introduce a component radial or substantially radial to the rocking axis B to the otherwise circular trajectory of the first splice member 2 and the second splice member 3, together with the holder 10, about the rocking axis B. Hence, the first splice member 2 and the second splice member 3 can be pressed tightly against tire component 9 along the splice path P, despite said holder 10 moving along a circular trajectory about the rocking axis B. The pressing force exerted by the first splice member 2 and the second splice member 3 onto the tire component 9 will act on said tire component 9 in a direction normal to the surface of the tire component 9 being pressed.

Alternatively, the first splice member 2 and the second splice member 3 may be moved in a pressing direction in or parallel to a direction normal to the surface of the tire component 9 that is being pressed.

In this exemplary embodiment, the holder 10 comprises a first holder member 11 that is connected to the base 14 at the rocking axis B and a second holder member 12 that is movable relative to said first holder member 11 in the pressing direction F. In this example, the second holder member 12 is movable relative to the first holder member 11 over a pair of guide rails 17. The pressing drive 16 is a linear drive, i.e. a pneumatic cylinder, that is arranged between the first holder member 11 and the second holder member 12 for biasing the second holder member 12 in the pressing direction F towards the tire component 9 relative to the first holder member 11.

Alternatively, the first splice member 2 and/or the second splice member 3 may be individually biased, i.e. by a biasing member located between the holder 10 and the respective splice member 2, 3.

The second holder member 12 is movable relative to the first holder member 11 along a stroke distance D that is limited by a lower stroke limiter 18 and an upper stroke limiter 19. The stroke limiters 18, 19 may be provided with an elastic buffer material to absorb impacts. Hence, the movement of the second holder member 12 relative to the first holder member 11 can be faster without damaging the splicer 1 and/or the tire component 9. Preferably, the stroke distance D is larger than the stroke distance required to have the second splice member 3 contact the tire component 9, with the remaining stroke being used to exert the pressing force in the pressing direction F.

As schematically shown in FIG. 2, the splicer 1 further comprises a control unit 5 that is operationally and/or electronically connected to the rocking drive 15 and the pressing drive 16 for controlling the said drives 15, 16. The control unit 5 may be arranged at the splicer 1 or remotely. The control unit 5 is arranged for performing the steps of a method for splicing the leading end LE and the trailing end TE of the tire component 9 together using the first splice member 2 and the second splice member 3. In particular, the control unit 5 is loaded with instructions or software, or is arranged, adapted or configured for performing the steps of the method. The control unit 5 may be connected to or comprise a user interface for controlling the steps semi-automatically, or the control unit 5 may be arranged for fully automatically controlling the splicer 1.

The method for splicing the leading end LE and the trailing end TE of the tire component 9 together with the use of the aforementioned splicer 1 will now be elucidated with reference to FIGS. 1-6.

FIG. 1 shows the situation in which the tire component 9 is arranged with the leading end LE and the trailing end TE thereof at the splice support 8. The tire component 9 is held in an annular or ring shape.

FIG. 2 shows the situation in which the holder 10 is rotated into a position about the rocking axis B in which the second splice member 3, at least in the pressing direction F, is aligned with or at least partially above second side 92 of the tire component 9, in particular near the preparatory splice position X along the splice path P.

Figure 3:
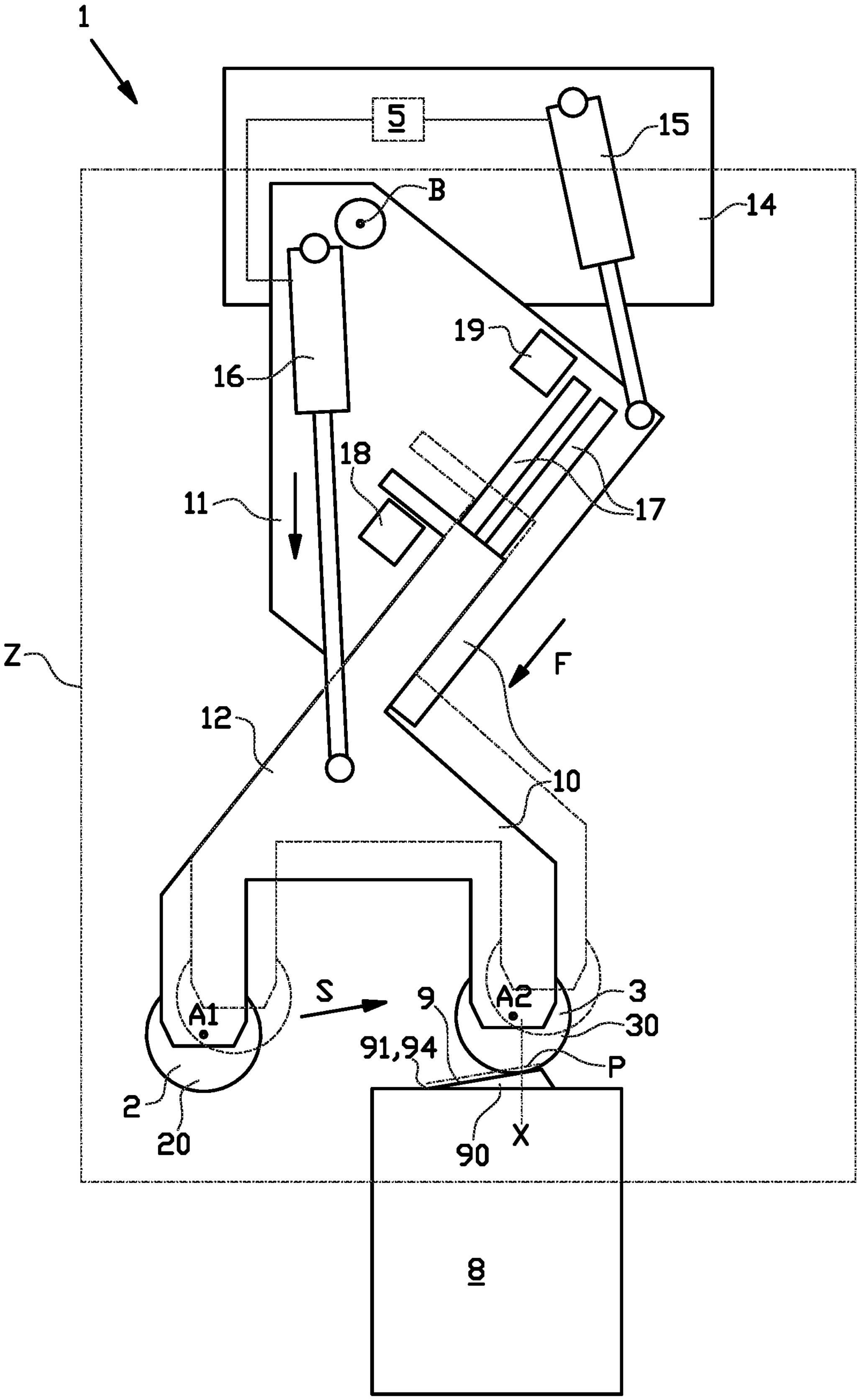

FIG. 3 shows the situation in which the pressing drive 16 is actuated or controlled to drive, bias or move the second holder member 12 towards the tire component 9 in the pressing direction F, thereby causing the second splice member 3 to contact and/or press onto the tire component 9 at the preparatory splice position X along the splice path P. More in particular, as shown in FIG. 1, the second splice member 3 is pressed onto the leading end LE and the trailing end TE. The pressing can form a local, preliminary joint between the leading end LE and the trailing end TE at the preparatory splice position X to prevent that the leading end LE and the trailing end TE split towards the second side 92 of the tire component 9 as a result of any waving or bulging during the subsequent splicing, as described hereafter.

The step of FIG. 3 is referred to in the claims as 'step b)'.

Figure 4:
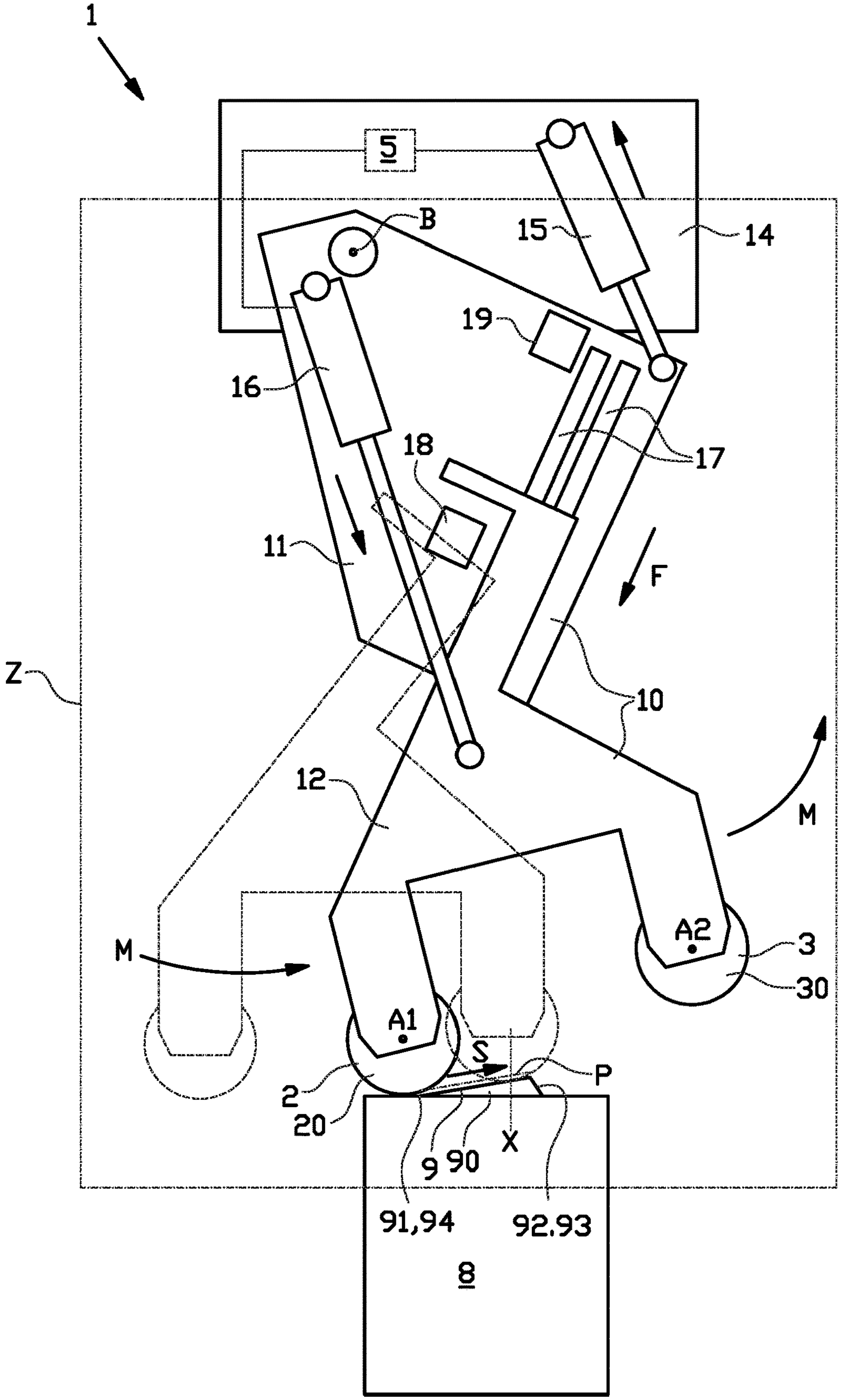

FIG. 4 shows the situation in which the rocking drive 15 has been actuated or controlled to drive or rotate the holder 10 as a whole relative to the base 14 in the rocking motion M about the rocking axis B in a direction such that the second splice roller 30 is rolled along the splice path P in the splice direction S away from the preparatory splice position X. Simultaneously, the first splice member 2 is brought into a position at the first side 91 of the tire component 9 to initiate splicing of the tire component 9 along the splice path P. In particular, the first splice roller 30 is located on the splice support 8 at or directly upstream of the first side 91 or the tip 94 of the tire component 9, considered in the splice direction S.

Figure 5:
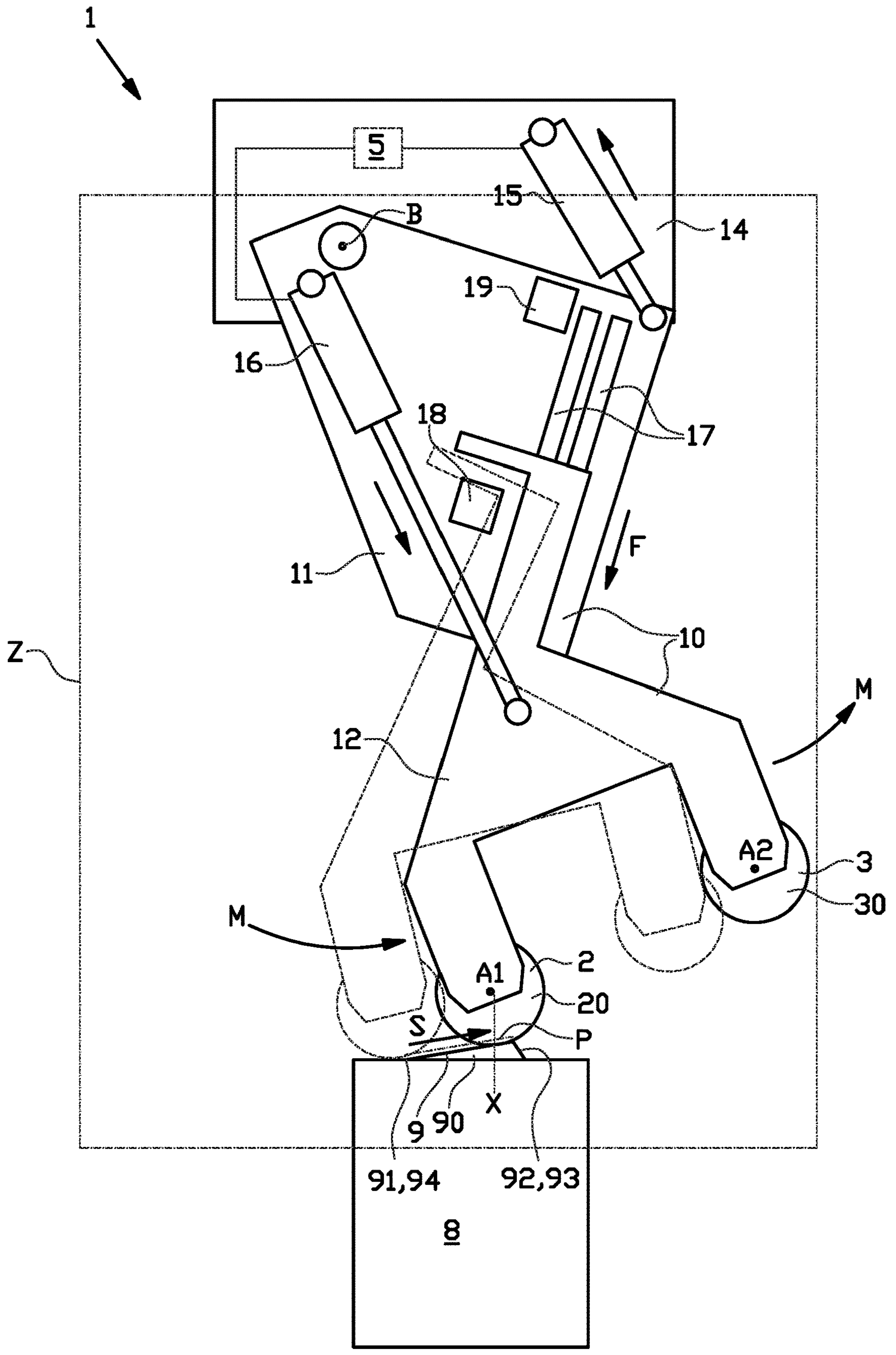

FIG. 5 shows the situation in which the rocking drive 15 has been actuated or controlled to move or rotate the holder 10 further in the rocking motion M about the rocking axis B to roll the first splice roller 30 over the tire component 9 along the splice path P, at least up to preparatory splice position X and optionally up to or beyond the second side 92, i.e. the base 93, of the tire component 9. Preferably, the range of the first splice roller 30 along the splice path P is sufficient to splice the entire width of the tire component 9 in the splice direction S.

The steps of FIGS. 4 and 5 are referred to in the claims as 'step a)'.

During the splicing of step a), the pressing drive 16 is continuously biasing the second holder member 12 to move in the pressing direction F towards the tire component 9 relative to the first holder member 11. Consequently, the first splice roller 20 can be kept in continuous pressing contact with the tire component 9.

Optionally, the pressing force exerted by the pressing drive 16 onto the second holder member 12 is variable. The pressure can be set prior to the pressing in step b). The pressure may alternatively be varied when carrying out step a) and/or step b). Consequently, also the splice force or pressing force exerted onto the tire component during the splicing in step a) can be varied during the splicing.

Figure 6:
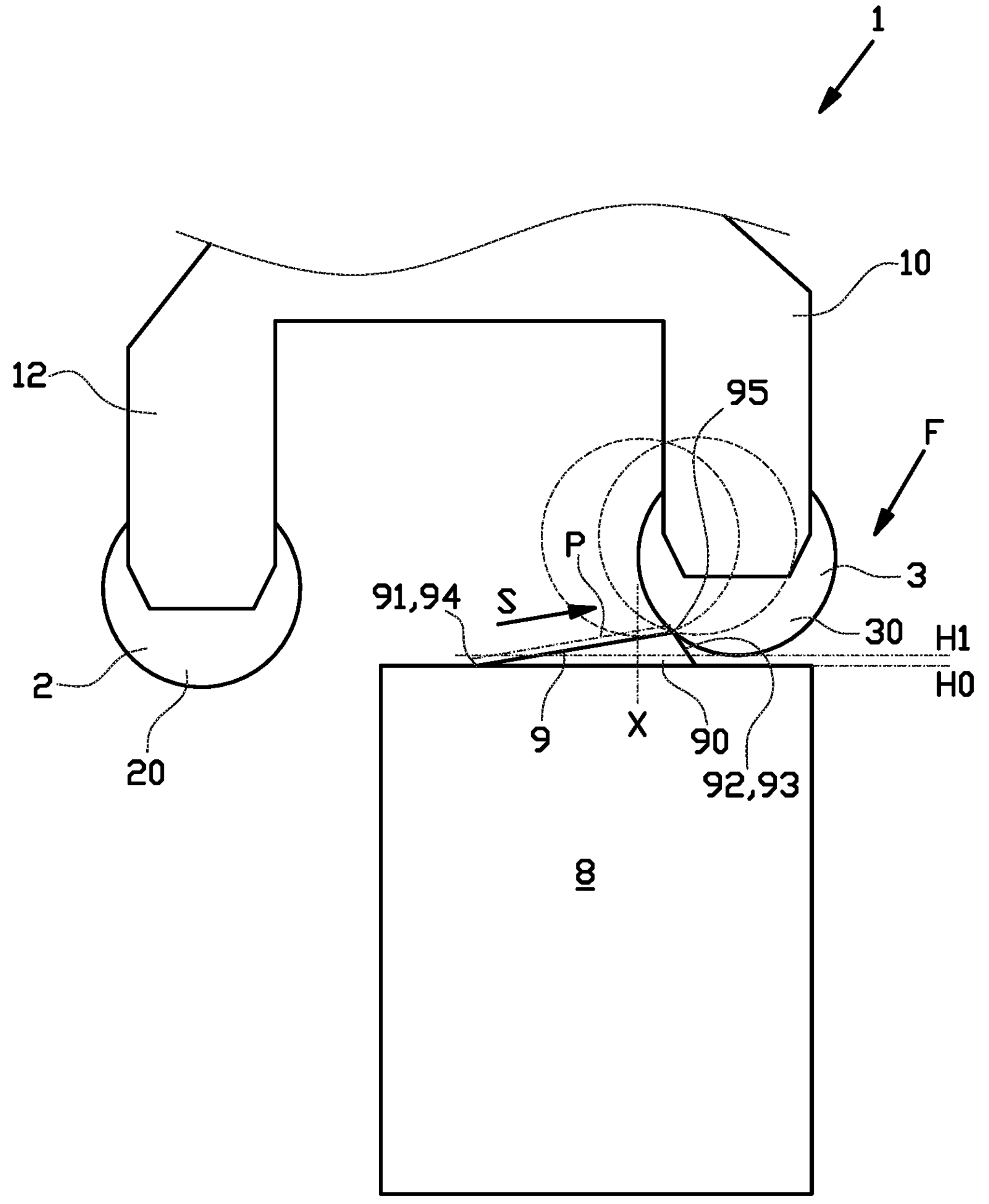
FIG. 6 shows a side view of a detail of the splicer during a further step of the aforementioned method.

FIG. 6 shows in more detail the moment that the second splice roller 30 is moved out of the preparatory splice position X in the splice direction S up and over the highest point 95 of the base 93 at the second side 92 of the tire component 9. Note that in the position of the second splice roller 30 that is shown in solid lines, the second splice roller 30 has already moved past the highest point 95 of the base 93 and has started to move down along the opposite slope at the second side 92 of the tire component 9 towards the splice support 8 as a result of the biasing on the second holder member 12 in the pressing direction F. The splice support 8 extends at a support height H0. The highest point 95 of the base 93 may be deformed excessively when the second splice roller 30 is allowed to move down along the second side 92 of the tire component 9 all the way up to the support height H0 of the splice support 8. To prevent such excessive deformation, the movement of the second splice member 3 is limited in the pressing direction F up to a floating height H1 short of or at a distance spaced apart from said support height H0.

Optionally, the floating height H1 may be adjustable, for example by mechanically changing the position of the lower stroke limiter 18 in FIG. 3 or by adjusting the relative position or the stroke of the pressing drive 16, in particular relative to the splice support 8. The floating height H1 can be set prior to the pressing of step b).

The floating height H1 may be set by allowing the pressing drive 16 to be moved freely and subsequently moving the splice support 8 relative to the splicer 1. The pressing drive 16 may for example be released, disconnected or decoupled from its initial position on the first holder member 11, for example by releasing a brake, after which the pressing drive 16 can be moved freely relative to said first holder member 11, for example along a guide rail. The splice support 8 may be adapted for such movement in a manner known per se as part of a plurality of radially movable segments of a bead-apex drum. The splice support 8 may actively lift the second splice member 3 up to the desired floating height H1, at which point the pressing drive 16 is activated, fixed, connected or coupled again, for example by engaging the brake again, and its stroke distance D is effectively adjusted.

By performing step b) prior to step a), as shown in FIG. 1, the leading end LE and the trailing end TE are pressed first and/or only in the preparatory splice position X. Hence, the leading end LE and the trailing end TE have not yet been exposed to the waving or bulging that occurs during step a). Hence, a preliminary joint can be still be formed reliably prior to the splicing in step a).

Figure 7:
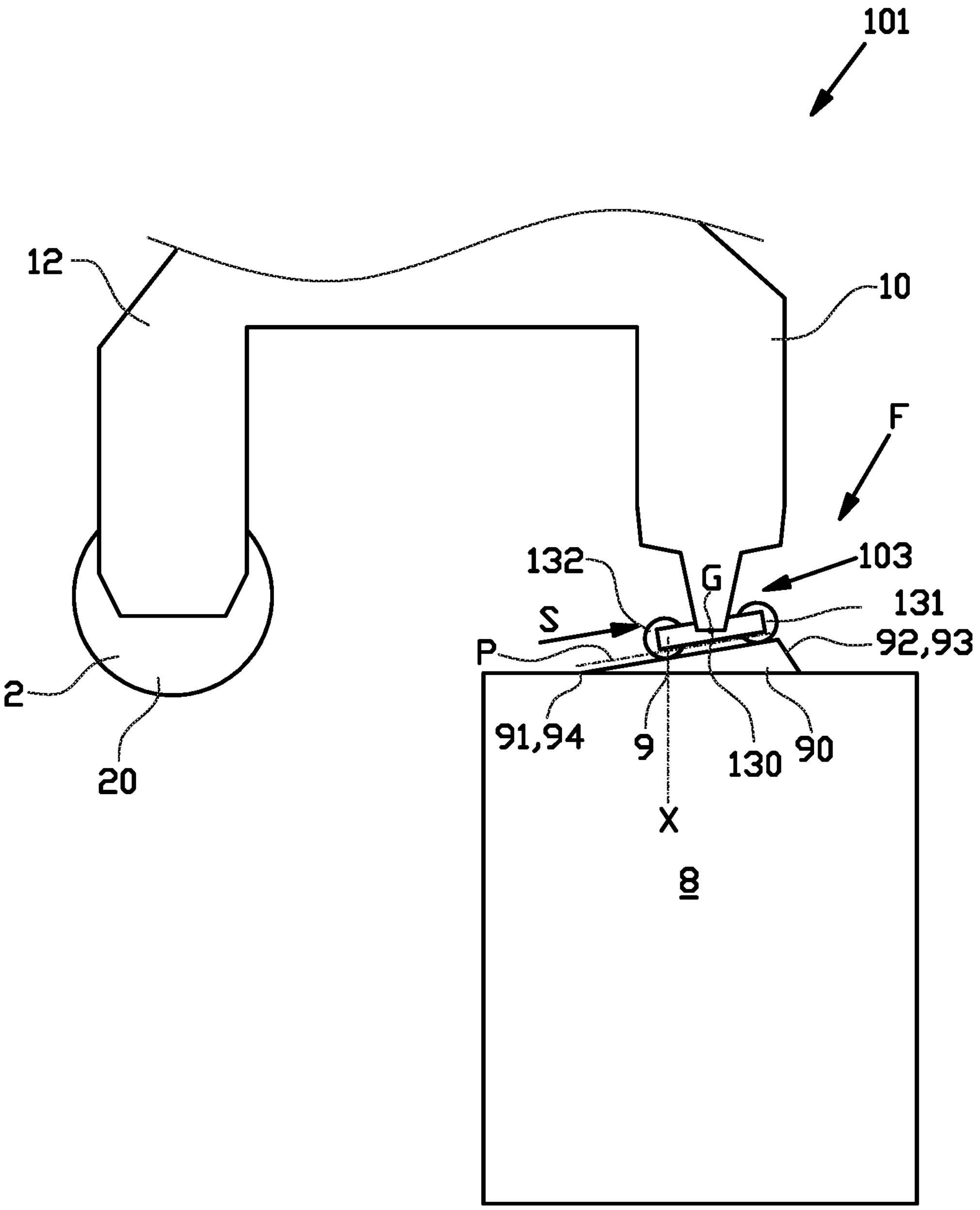
FIG. 7 shows a side view of an alternative splicer according to a second exemplary embodiment of the invention.

FIG. 7 shows an alternative splicer 101 according to a second exemplary embodiment of the invention that differs from the previously discussed splicer 1 in that the second splice member 103 comprises a set of two second splice rollers 131, 132. The second splice rollers 131, 132 are rotatable about mutually parallel and spaced apart second roller axes. The set of second splice rollers 131, 132 is mounted on a common carriage 130 that is pivotable about a pivot axis G relative to the holder 10, to allow the set of second splice rollers 131, 132 to assume an optimal orientation for pressing and/or forming the preliminary joint in step b). The second splice rollers 131, 132 can have a relative small diameter compared to the diameter of the first splice roller 20 to allow a more local and/or higher pressing force in the preparatory splice position X. The second splice member 103 may optionally have more than two second splice rollers. For the purpose of the invention the second splice roller 131 that is the furthest upstream considered in the splice direction S defines the preparatory splice position X.

Figure 8:
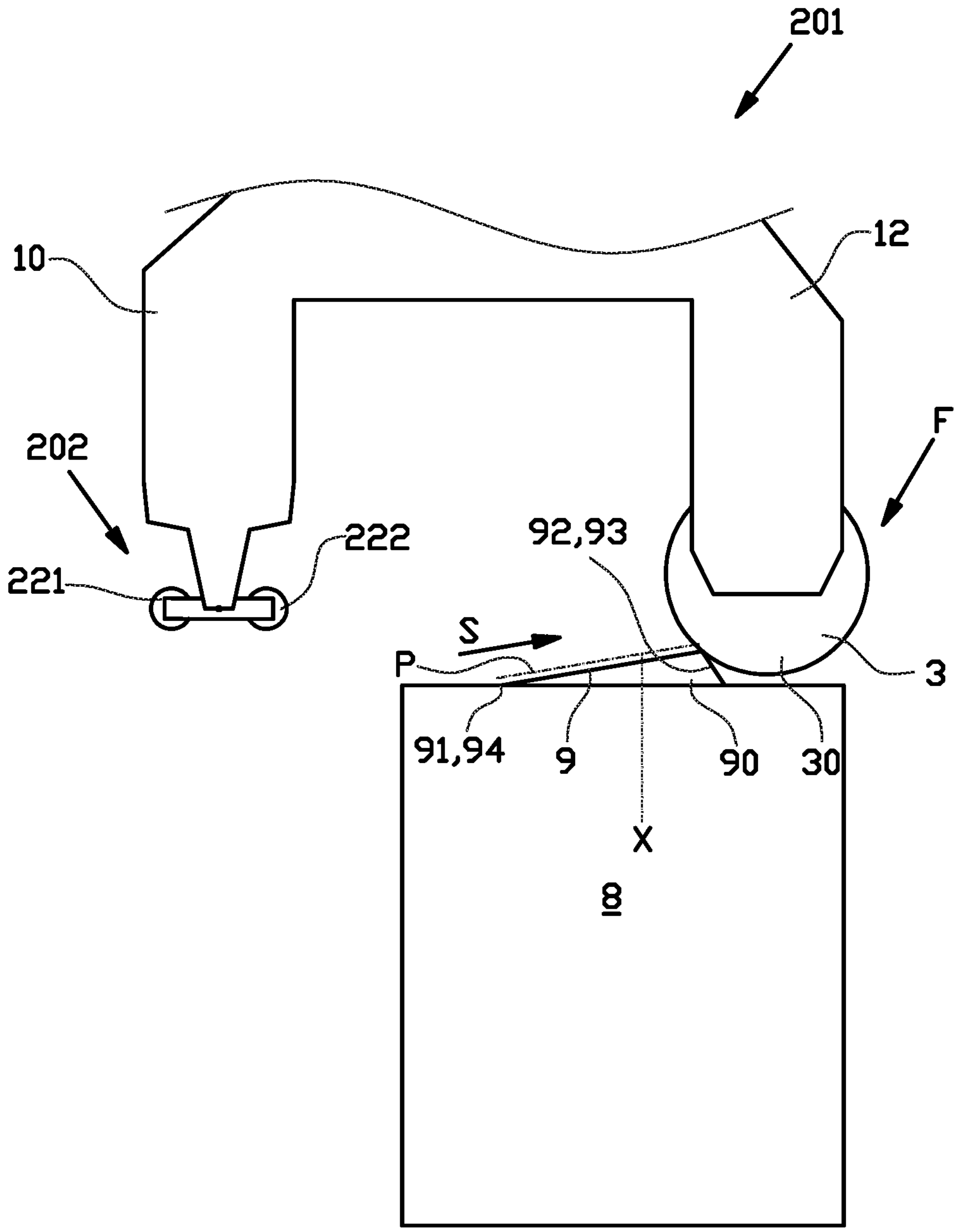
FIG. 8 shows a side view of a further alternative splicer according to a third exemplary embodiment of the invention.

FIG. 8 shows a further alternative splicer 201 according to a third exemplary embodiment of the invention that differs from the previously discussed splicers 1, 101 in that the first splice member 202 comprises a set of two first splice rollers 221, 222, mounted to the holder 10 in a similar way as the set of second splice rollers 131, 132 in the previous embodiment. The first splice rollers 221, 222 can have a relative small diameter compared to the diameter of the second splice roller 30 to allow a more local and/or higher splicing force along the splice path P.

Figure 9:
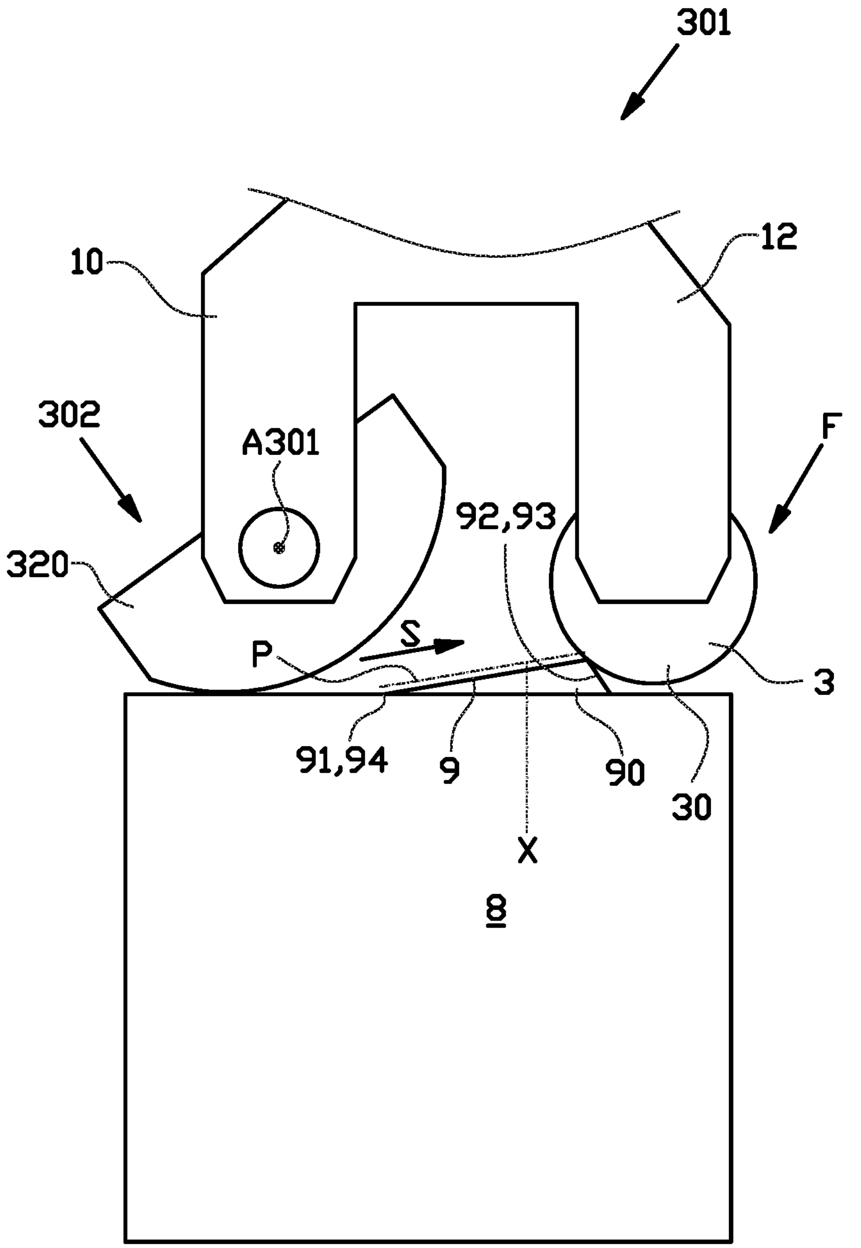
FIG. 9 shows a side view of a further alternative splicer according to a fourth exemplary embodiment of the invention.

FIG. 9 shows a further alternative splicer 301 according to a fourth exemplary embodiment of the invention that differs from the previously discussed splicers 1, 101, 201 in that the first splice member 302 comprises a circular segment 320. The circular segment 320 can have a relatively large radius to more evenly distribute the splicing force along the splice path P. The circular segment 320 can be rocked, rolled and/or swiveled back-and-forth along the splice path P about a swivel axis A301.

Figure 10:
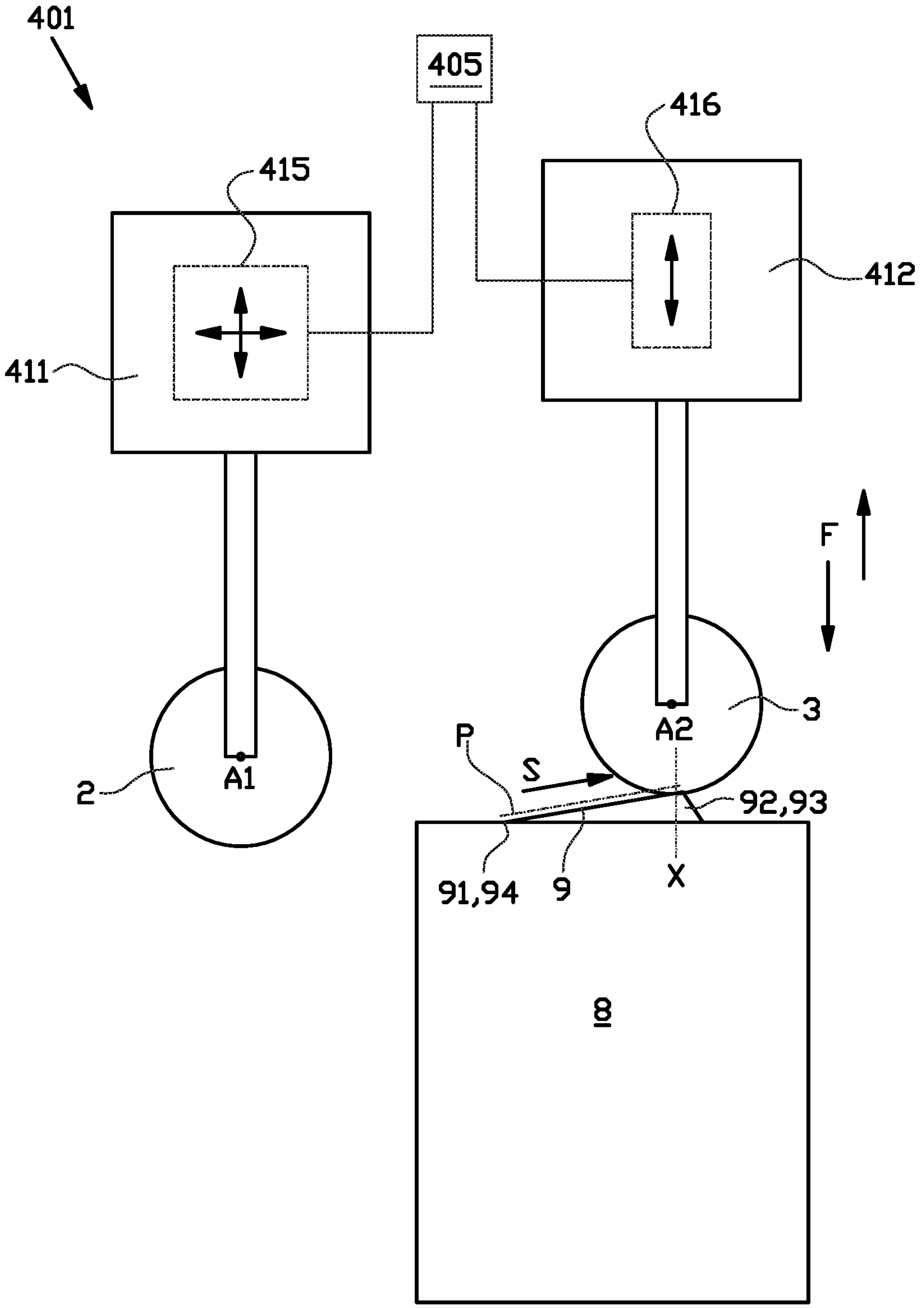
FIG. 10 shows a side view of a further alternative splicer according to a fifth exemplary embodiment of the invention.

FIG. 10 shows a further alternative splicer 301 according to a fifth exemplary embodiment of the invention that differs from the previously discussed splicers 1, 101, 201, 301 in that the first splice member 2 and the second splice member 3 are independently movable relative to each other. In particular, the further alternative splicer 301 comprises a first holder 411 and a second holder 412 for independently holding the first splice member 2 and the second splice member 3, respectively. The first splice member 2 and the second splice member 3 remain rotatable relative to their respective holders 411, 412 about their respective roller axes A1, A2. The further alternative splicer 401 is further provided with a first drive 415 for moving the first holder 411 and/or the first splice member 2, a second drive 416 for moving the second holder 412 and/or the second splice member 3 and a control unit 405 that is electronically and/or operationally connected to the first drive 415 and the second drive 416 for independently controlling said drives 415, 416. Each drive 415, 416 may comprise a multi-axis manipulator, such as a robotic arm, or an XY-drive system.

The independent drives 415, 416 may provide greater flexibility when positioning the first splice member 2 and the second splice member 3. The movements of may comprise linear trajectories, circular trajectories, non-circular trajectories, or a combination thereof. The first splice member 2 may for example accurately follow and/or move along the splice path P. The second splice member 3 may be pressed onto the tire component 9 in a pressing direction F perpendicular or normal to the splice support S, or alternatively perpendicular or normal to the orientation of the upper surface of the tire component 9, and return in an opposite direction.

Figure 11:
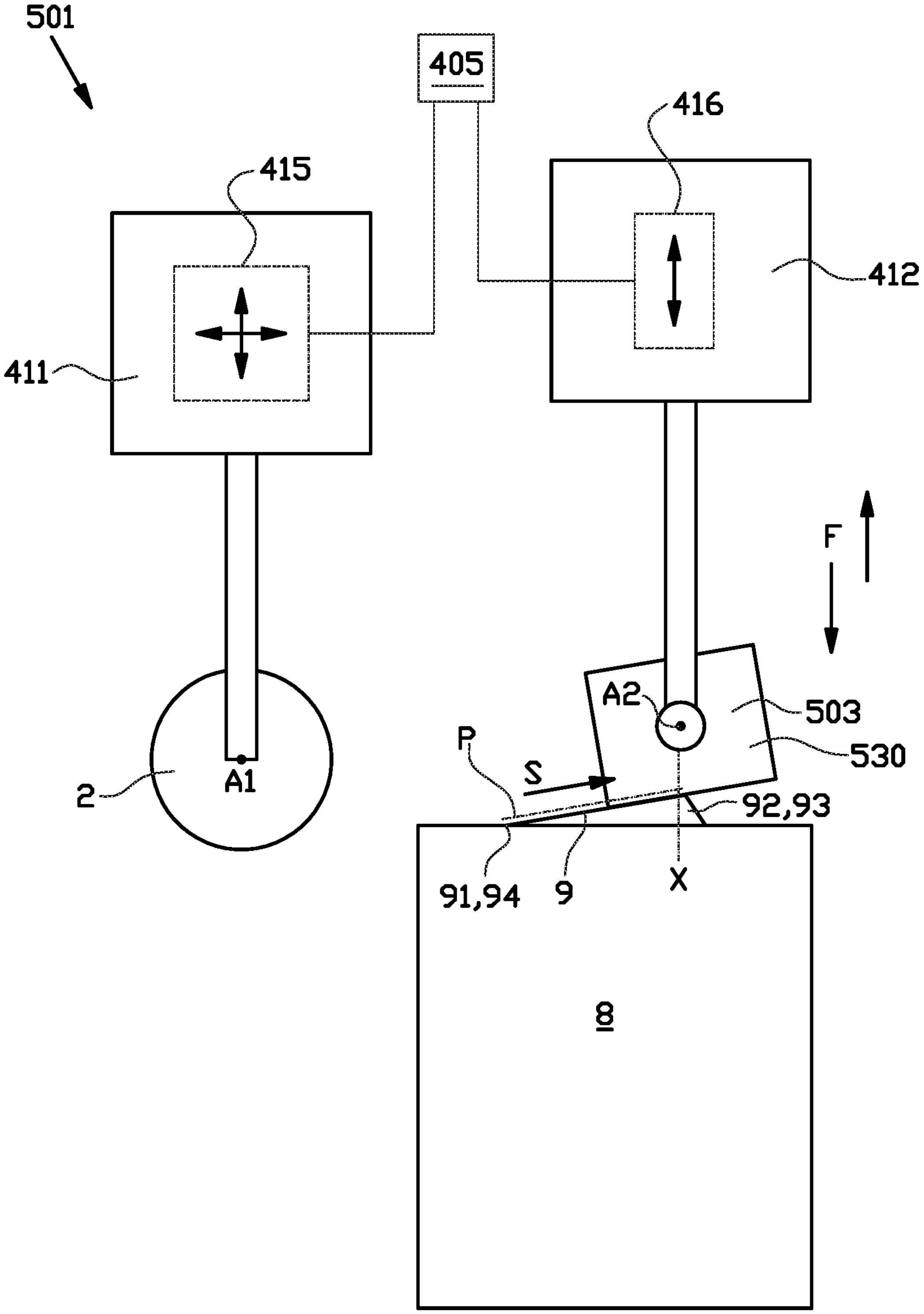
FIG. 11 shows a side view of a further alternative splicer according to a sixth exemplary embodiment of the invention.

FIG. 11 shows a further alternative splice 501 according to a sixth exemplary embodiment of the invention that differs from the splicer 401 according to the third embodiment of the invention in that its second splice member 503 is or comprises a non-circular pressing member 530, i.e. with a shape that is adapted to optimally match the shape and/or orientation of the tire component 9 in the preparatory splice position X. In this example, the non-circular pressing member 530 has the shape of a block with a flat pressing surface. Alternatively, the non-circular pressing member 530 may have the form of a finger. Moreover, in this example, the second splice member 503 is still rotatable relative to the second holder 412 about the second roller axis A2 to allow the non-circular pressing member 530 to assume an optimal orientation for pressing onto the tire component 9. Alternatively, the second pressing member 503 may be fixed or an integral part of the second holder 412. The pressing in step b) is achieved by pressing the non-circular pressing member 530 onto the leading end LE and the trailing end TE at the preparatory splice position X. The non-circular pressing member 530 is not rolled away from said preparatory splice position X. Instead, it is lifted from the tire component 9 after the pressing in step b) in a direction opposite to the pressing direction F.

Figure 12:
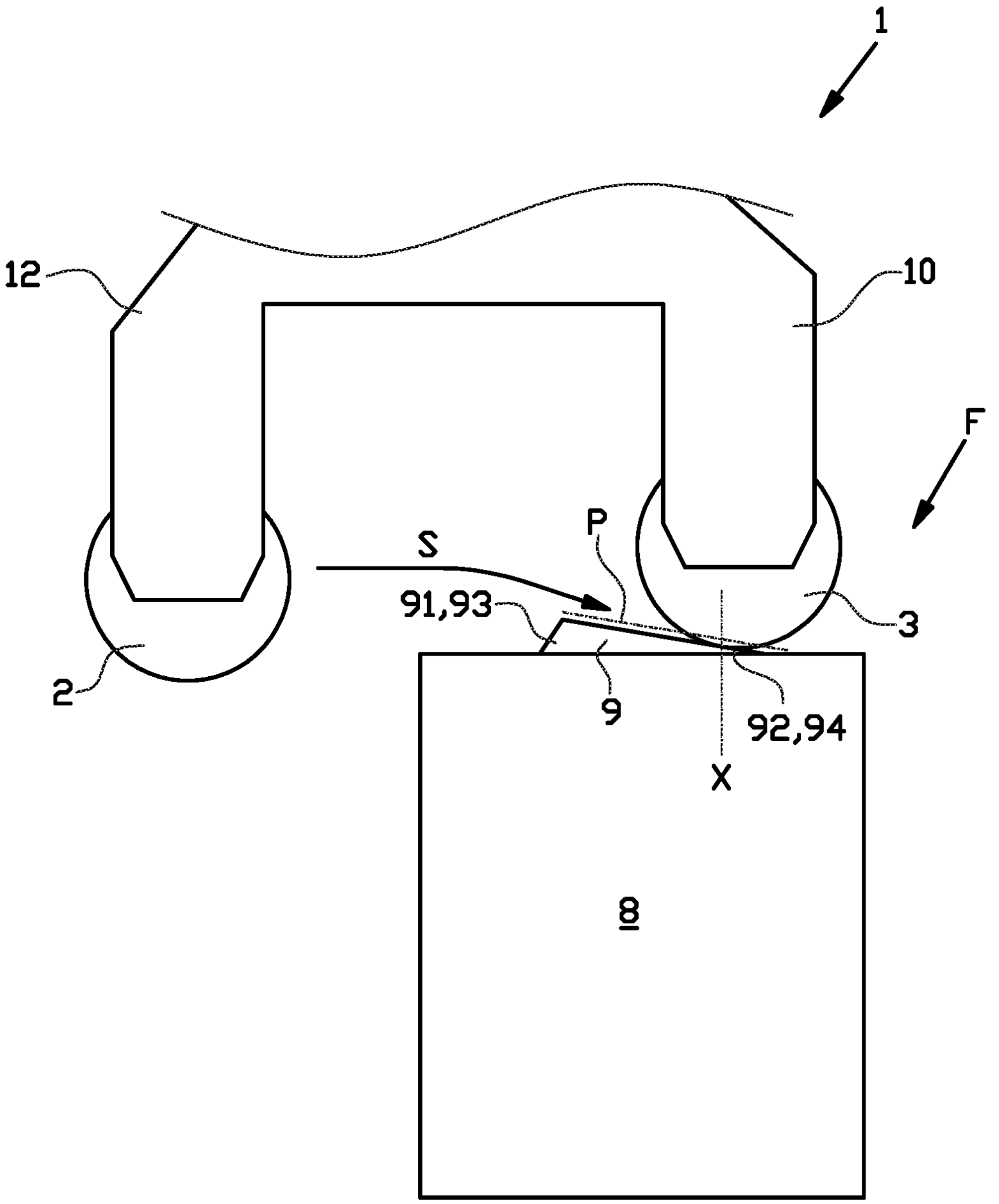
FIG. 12 shows a side view of the splicer according to FIGS. 2-5, in which the orientation of the tire component is reversed.

FIG. 12 shows a variation of the method as shown in FIGS. 1-5 which differs from said method in that the orientation of the tire component 9 relative to the splicer 1 and/or the splice support 8 is reversed. In particular, the triangular cross section of the tire component 9 now has its base 93 at the first side 91 and its tip 94 at the second side 92. Consequently, the preparatory splice position X is located at or near the tip 94, instead of at or near the base 93. Step b) is performed at or near said tip 94 and step a) involves splicing the tire component 9 in the splice direction S from the base 93 at the first side 91 towards the tip 94 at the second side 92.

Figure 13:
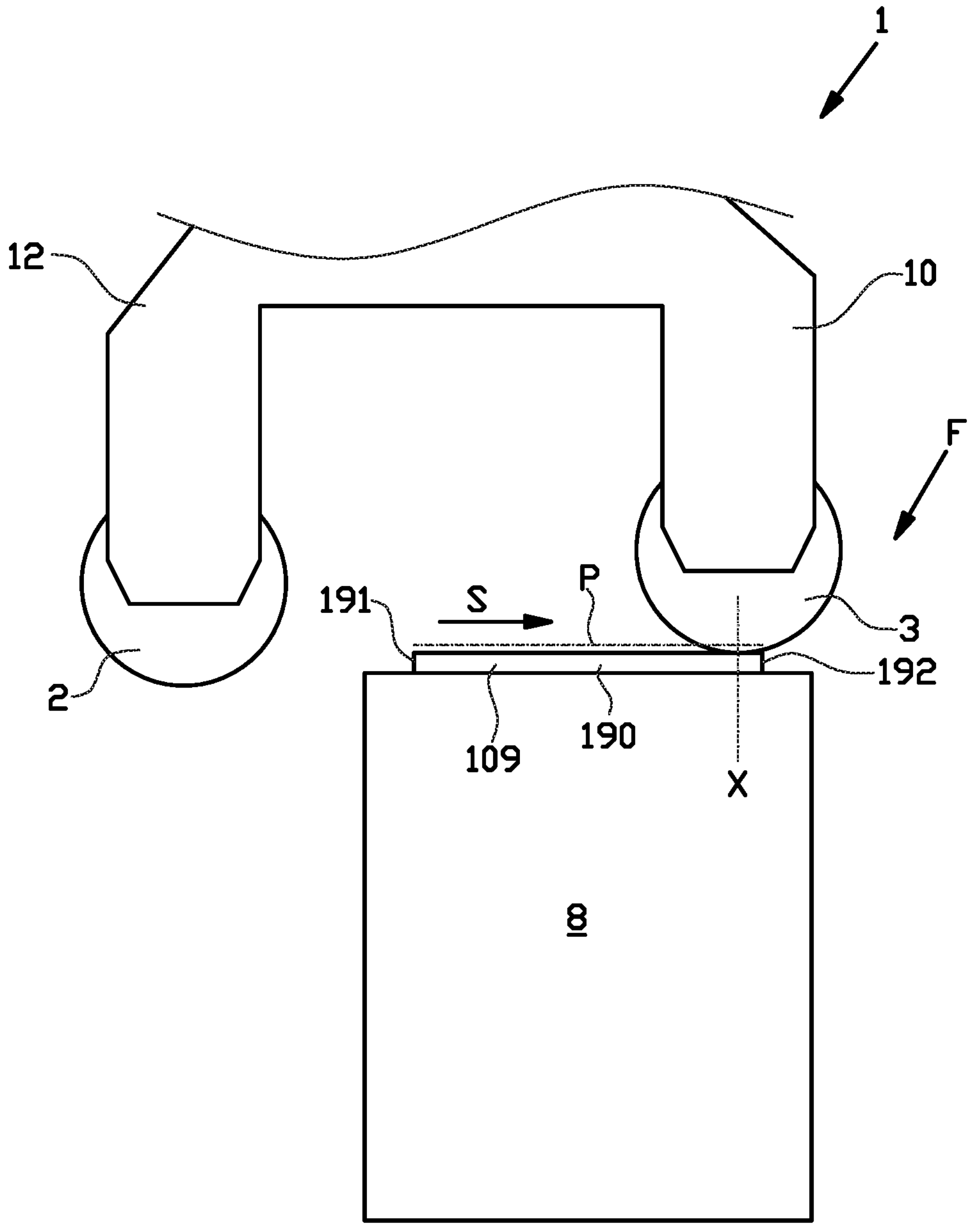
FIG. 13 shows a side view of the splicer according to FIGS. 2-5, in which a different type of tire component is being spliced.

Although the effects of waving and bulging have been the greatest in tire components 9 like the apex in FIGS. 1-12, it is envisioned that the method according to the present invention can be applied to tire components other than an apex. FIG. 13 shows a further variation of the method as shown in FIGS. 1-5 which differs from said method in that an alternative tire component 109 is used, having a different cross sectional shape. In this example, the alternative tire component 109 has a strip body 190 with a rectangular or substantially rectangular cross section. Nonetheless, the alternative tire component 109 still has a first side 191 and a second side 192 which can be pressed in step b) and splice in step a) in substantially the same way.

Alternatively, the tire component may have a non-rectangular, non-triangular cross section, for example a crowned or trapezoidal cross section.

It is further observed that the method according to the present invention can alternatively be carried out by a single splice member, for example the first splice member 2 of FIG. 10. In such a scenario, the control unit 405 is operationally connected to the drive 415 and configured for controlling the drive 415 to first move the single splice member 2 to the preparatory splice position X for the pressing in step b), and subsequently moving the single splice member 2 along the splice path P across the tire component 9 for the splicing in step a).

Figure 14:
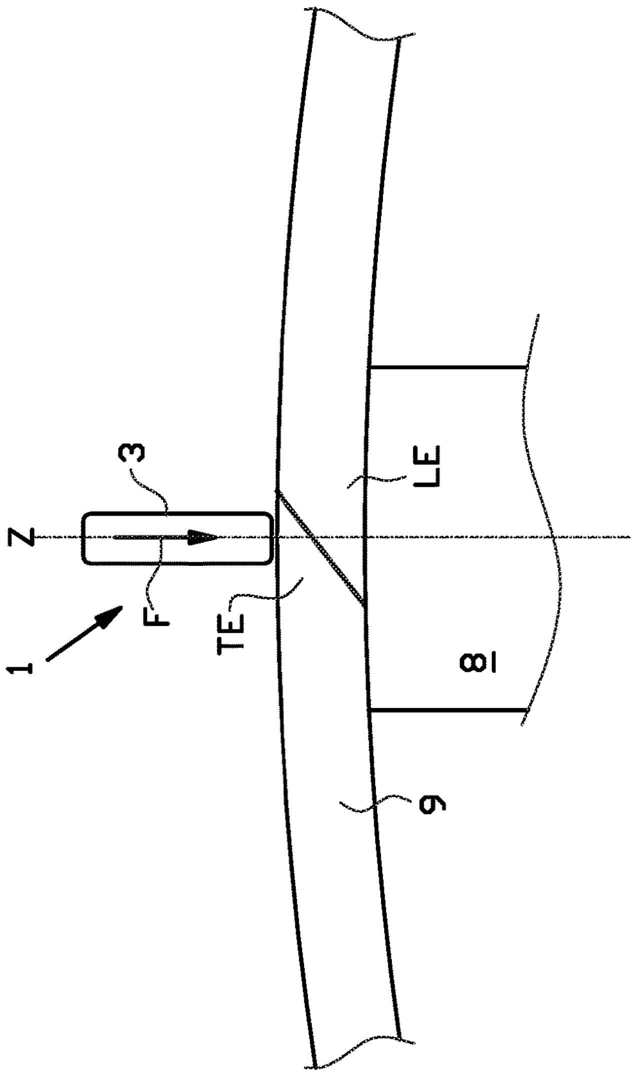
FIG. 14 shows a front view of the tire component, the splice support and the splicer of FIG. 1, with the leading and the trailing end overlapping with said trailing end at an oblique angle.

In the aforementioned embodiments, the splicers 1, 101, 201, 301, 401, 501 are used to splice the leading end LE and the trailing end TE in an overlapping configuration, such as the one shown schematically in FIG. 14. In particular, the leading end LE and the trailing end TE are cut obliquely. Hence, the overlapping section of the trailing end TE can be tightly adhered to the underlying section of the leading end LE by pressing onto the tire component 9 in the pressing direction F with one of the aforementioned splicers 1, 101, 201, 301, 401, 501.

Figure 15:
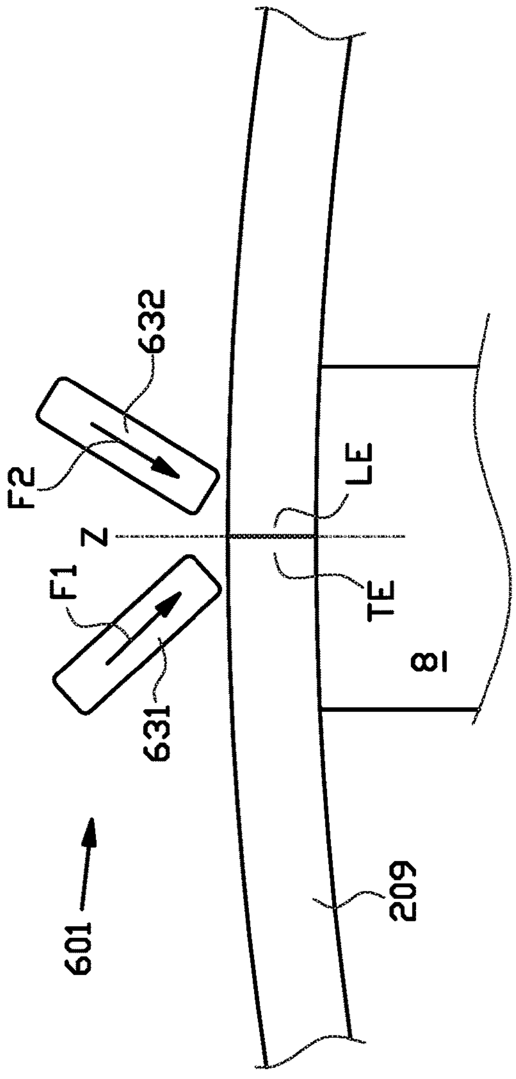
FIG. 15 shows a front view of a further alternative tire component having a butt-spliced leading end and trailing end, and a further alternative splicer according to a seventh exemplary embodiment of the invention for splicing said butt-spliced leading end and trailing end.

As shown in FIG. 15, an alternative tire component 209 may be provided having a non-overlapping leading end LE and trailing end TE. In particular, the leading end LE and the trailing end TE have been cut at a right angle. Such leading end LE and trailing end TE are butt-spliced. In order to securely form the preliminary joint between the leading end LE and the trailing end TE prior to the butt-splicing, a further alternative splicer 601 may be provided according to a seventh exemplary embodiment of the invention. Said further alternative splicer 601 differs from the previously discussed splicers 1, 101, 201, 301, 401, 501 in that it has at least one second splice member 631 and preferably a set of two second splice members 631, 632 which are angled to the splice plane Z so as to exert a pressing force onto at least one of the leading end LE and the trailing end TE in a pressing direction F1, F2 towards the other of the leading end LE and the trailing end TE. Preferably, two second splice members 631, 632 simultaneously exert a pressing force onto the respective ends LE, TE from opposite sides of the splice plane Z.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 splicer
10 holder
11 first holder member
12 second holder member
14 base
15 rocking drive
16 pressing drive
17 guides
18 lower stroke limiter
19 upper stroke limiter
2 first splice member
20 first splice roller
3 second splice member
30 second splice roller
5 control unit
8 splice support
9 tire component
90 strip body
91 first side
92 second side
93 base
94 tip
95 highest point of the base
91 first side
92 second side
101 alternative splicer
103 second splice member
130 carriage
131 second splice roller
132 second splice roller
109 alternative tire component
190 strip body
201 alternative splicer
202 first splice member
221 first splice roller
222 first splice roller
209 alternative tire component
301 further alternative splicer
302 first splice member
320 first circular segment
401 further alternative splicer
405 control unit
411 first holder
412 second holder
415 first drive
416 second drive

501 further alternative splicer
503 second splice member
530 non-circular pressing member
601 further alternative splicer
631 first splice roller
632 second splice roller
A1 first roller axis
A2 second roller axis
A301 swivel axis
B rocking axis
C circumferential direction
D stroke distance
F pressing direction
F1 first pressing direction
F2 second pressing direction
G pivot axis
H0 support height
H1 floating height
LE leading end
M rocking motion
P splice path
S splice direction
TE trailing end
X preparatory splice position
Z splice plane

The invention claimed is:

1. A method for splicing a leading end and a trailing end of a tire component together, wherein the tire component has a strip body with longitudinal edges, wherein the method comprises the steps of:

a) splicing the leading end and the trailing end together along a splice path extending across the tire component, in a splice direction from a first longitudinal edge of the strip body towards a second longitudinal edge of the strip body opposite to the first longitudinal edge, by initiating the splicing along the splice path at the first longitudinal edge; and b) prior to the splicing, forming a preliminary joint between the leading end and the trailing end at a preparatory splice position along the splice path;

wherein the preparatory splice position is spaced apart from the first longitudinal edge.

2. The method according to claim 1, wherein the preparatory splice position is closer to the second longitudinal edge than the first longitudinal edge.

3. The method according to claim 1, wherein the leading end and the trailing end are spliced between the first longitudinal edge and the preparatory splice position by the splicing of step a) only.

4. The method according to claim 1, wherein the splicing of step a) is performed continuously from the first longitudinal edge up to the second longitudinal edge.

5. The method according to claim 1, wherein the leading end and the trailing end are pressed in step b) in a pressing direction transverse or perpendicular to the splice direction.

6. The method according to claim 1, wherein the tire component is an apex.

7. The method according to claim 6, wherein the apex has a triangular cross section with a base and a tip, wherein the first longitudinal edge is the tip and the second longitudinal edge is the base.

8. The method according to claim 6, wherein the apex has a triangular cross section with a base and a tip, wherein the first longitudinal edge is the base and the second longitudinal edge is the tip.

9. The method according to claim 1, wherein a first splice member is used for the splicing in step a) and a second splice member is used for the forming of the preliminary joint in step b).

10. The method according to claim 9, wherein the first splice member trails the second splice member in the splice direction.

11. The method according to claim 10, wherein the second splice member comprises at least one second splice roller, wherein the method further comprises the step of rolling the at least one second splice roller along the splice path in the splice direction away from the preparatory splice position after the forming the preliminary joint in step b).

12. The method according to claim 10, wherein the second splice member comprises a non-circular pressing member, wherein the pressing in step b) is achieved by pressing the non-circular pressing member onto the leading end and the trailing end at the preparatory splice position.

13. The method according to claim 10, wherein the first splice member and the second splice member are independently movable relative to each other.

14. The method according to claim 10, wherein the leading end and the trailing end are supported on a splice support extending at a support height, wherein the second splice member is movable in a pressing direction transverse or perpendicular to the splice direction towards said splice support up to a floating height short of said support height.

15. The method according to claim 14, wherein the floating height is adjustable, wherein the floating height is set prior to the forming of the preliminary joint of step b).

16. The method according to claim 9, wherein the first splice member is a first splice roller that is rotatable about a first roller axis, wherein the splicing in step a) is achieved by rolling the first splice roller along the splice path in the splice direction.

17. The method according to claim 16, wherein the first splice member is moved along the splice path as part of a rocking motion about a rocking axis that is parallel to and spaced apart from the first roller axis.

18. The method according to claim 17, wherein the first splice member and the second splice member are moved together in the rocking motion about the rocking axis.

19. The method according to claim 1, wherein the leading end and the trailing end are pressed in step b) with a pressing force that is variable, wherein the pressing force is varied during or set prior to the pressing of step b).

20. The method according to claim 1, wherein the leading end and the trailing end are spliced in step a) with a splice force that is variable, wherein the splice force is varied during or set prior to the splicing of step a).

* * * * *